United States Patent [19]

Dittert

[11] Patent Number: 4,715,021

[45] Date of Patent: Dec. 22, 1987

[54] METHOD FOR FILTERING AND COMBINING SEISMIC DATA HAVING DIFFERENT SPECTRAL CHARACTERISTICS

[75] Inventor: Karen K. Dittert, Houston, Tex.

[73] Assignee: Exxon Production Research Co., Houston, Tex.

[21] Appl. No.: 638,814

[22] Filed: Aug. 8, 1984

[51] Int. Cl.$^4$ .......................... G01V 1/28; G01V 1/36
[52] U.S. Cl. ......................................... 367/41; 367/46; 364/421
[58] Field of Search ...................... 367/21, 24, 41, 45, 367/46; 364/421

[56] References Cited

U.S. PATENT DOCUMENTS

| | | | |
|---|---|---|---|
| 4,326,271 | 4/1982 | Ziolkawski | 367/56 |
| 4,348,749 | 9/1982 | Galbraith | 367/63 |
| 4,486,865 | 12/1984 | Rueble | 367/46 |
| 4,486,866 | 12/1984 | Muir | 367/100 |
| 4,500,978 | 2/1985 | Ziolkawski et al. | 367/15 |

OTHER PUBLICATIONS

Gibson et al, "Predietine Deconvolution and . . . ", 4/84, pp. 379–397, Geophysics, vol. 49, #4.
Bickel, "The Effects of Naise or Minimum-Phase . . . ", 8/82, pp. 1174–1184, Geophysics, vol. 47, #8.
Mashara et al, "Concatenated Sequences . . . ", 5/81, pp. 342–350, IEEE Trans. Aerosp. & Elect. Syst., vol. ACS17 #3 abst. provided.

*Primary Examiner*—Nelson Moskowitz
*Attorney, Agent, or Firm*—Alfred A. Equitz

[57] ABSTRACT

A method of filtering and combining seismic data, such as data from two or more seismic sources having different spectral characteristics. A plurality of seismic signals are transmitted into a subterranean earth formation and a resulting data trace for each seismic signal is recorded. A correlating signal is generated for each data trace, such that the sum of the correlations of each correlating signal with its associated trace is an approximately minimum phase signal whose frequency amplitude spectrum is the sum of the frequency amplitude spectra of the seismic signals. In a preferred embodiment, the correlating signals are generated by obtaining reference signals representing the seismic signals prior to propagation through the earth formation, concatenating these reference signals and inserting a zero-amplitude signal between each reference signal, and then performing least-squares deconvolution on the concatenated signal. The correlating signal for each trace is identified as the portion of the deconvolved signal which corresponds temporally to the reference signal associated with such trace.

7 Claims, 10 Drawing Figures

METHOD FOR FILTERING AND COMBINING SEISMIC DATA HAVING DIFFERENT SPECTRAL CHARACTERISTICS

BACKGROUND OF THE INVENTION

FIELD OF THE INVENTION

This invention relates in general to seismic prospecting. In particular, it relates to seismic prospecting methods wherein seismic data having different spectral characteristics are combined.

To locate reflecting interfaces in the earth by seismic prospecting methods, seismic signals are transmitted through the earth, reflected by subterranean interfaces, and then detected and recorded. The time lapse between the transmission and detection of such a seismic signal gives the two way travel time of the seismic signal through the earth. The measured time lapse is then used to locate the interface.

Typically many subterranean interfaces are present in the earth, and a transmitted signal is reflected by a number of such interfaces to produce a number of reflected signals. The reflected signals from a single transmitted signal may be recorded as a seismic data trace. If the reflected signals do not superimpose significantly on the seismic data trace, the arrival times of the reflected signals may be readily determined to locate the subterranean interfaces. However, the interfaces are difficult to locate if many reflected signals are superimposed on each other.

If a vibratory seismic source is used, the seismic signal generated is of relatively long duration and the reflected signals from different interfaces typically superimpose upon one another. A typical signal transmitted by a vibratory seismic source consists of a sine wave sweeping over a frequency spectrum as a function of time. The similarity of the reflected signals to the transmitted signal is often masked because many arriving reflected signals are superimposed on each other. Thus, it is difficult to locate arrival times by visual observation of the seismic record. Correlation methods have been developed to help solve such problems.

The cross-correlation function of the transmitted signal and the received signal is a graph of the similarity between the two signal waveforms as a function of the time shift between them. The waveform of the received signal is obtained from a recording of the received signal. The receiver recording typically starts at the time when transmission of the seismic signal begins. In the correlation process, the instantaneous amplitudes of the received signal and of the transmitted signal are multiplied and the product summed over the duration of the transmitted wave form. The process is repeated with the transmitted signal progressively shifted in time relative to the received signal, and the summations are plotted against the time shifts to produce a cross-correlation curve. For a fuller exposition of the principles of correlation, see "Correlation Techniques—A Review" by N. A. Anstey in *Geophysical Prospecting*, Volume 12, No. 4 (1964), pages 355–382.

Correlation methods have been developed wherein several different portions of selected swept sine wave seismic signals are transmitted, successively in some methods and simultaneously in others. For example, U.S. Pat. No. 4,037,190, issued July 19, 1977 to Martin, discloses a method including the steps of successive generation of a number of vibrator sweeps having different beginning and final frequencies, digitization of each received seismic signal, correlation of each digitized received signal with its associated digitized driving signal ("sweep signal") to produce a number of correlograms each corresponding to a sweep signal, and thereafter the summing or "stacking" of the correlograms. The individual correlograms consist of approximately "zero phase" wavelets. Two problems are encountered with stacked vibrator data produced by this method. First the zero phase nature of the correlogram wavelets makes it difficult to relate the reflection arrival time (and polarity) determined therefrom to that determined from dynamite data. Also the zero phase nature of the correlogram wavelets makes it difficult to pick first arrivals.

Correlation methods of the type described above are also useful for combining or stacking seismic data generated by two or more seismic sources (which may or may not be vibratory seismic sources) each of which has different spectral characteristics.

Another conventional seismic prospecting method alleviates the two problems associated with the correlation methods described above, but results in data having poor resolution and further is not suitable for combining data from two or more seismic sources each of which has different spectral characteristics. Such method (which shall be denoted as the "deconvolved sweep" method) includes the steps of performing a vibrator sweep and recording a seismic data trace resulting therefrom, performing least-squares deconvolution on the sweep signal, and then correlating the data trace with the deconvolved sweep signal to produce an approximately minimum phase signal. However, the approximately minimum phase signal produced according to this deconvolved sweep method possesses a nearly rectangular frequency amplitude spectrum and is therefore quite "ringy". Such nearly rectangular spectra are associated with very cyclic pulses with large side-lobes, and thus with the concomitant poor resolution, just as sharp cutoff filters are ringy and hence result in poor resolution. If minimum phase signals produced by the deconvolved sweep method are added together, the resulting summed signal will not, in general, be minimum phase or even approximately minimum phase.

It has not been known, until the present invention, how to combine seismic data having different spectral characteristics, or how to combine data resulting from two or more seismic vibrator sweeps, in a manner which alleviates all of the above-noted problems associated with traditional seismic prospecting methods. In particular, it has not been known, until the present invention, how to employ correlation methods to combine two or more seismic data traces, each of which data traces consists of one or more wavelets, in such a manner that the sum of the individual correlated wavelets is approximately minimum phase and so that the sum of the individual correlated wavelets possesses a frequency amplitude spectrum which is the sum of the frequency amplitude spectrum of the individual correlated wavelets.

SUMMARY OF THE INVENTION

The present invention is a method of filtering and combining seismic data (such as seismic data from two or more sources having different spectral characteristics) which includes the steps of transmitting two or more seismic signals into a subterranean earth formation; recording the associated seismic data traces; generating a special correlating signal for each trace, where the correlating signal for each trace is such that the sum of the correlations of each of the correlating signals with its associated trace is an approximately minimum phase signal whose frequency amplitude spectrum is the sum of the frequency amplitude spectra of the seismic signals; then correlating each trace with its associated correlating signal; and thereafter stacking the correlated signals.

In the preferred embodiment, the special correlating signal is generated by performing the following steps: obtaining reference signals representing the seismic signals prior to their propagation through a subterranean earth formation, concatenating these reference signals and inserting between each pair of concatenated reference signals a zero-amplitude signal having time duration not less than the operator length associated with the following deconvolution step, and generating a deconvolved signal by performing least-squares deconvolution on the concatenated signal. Each portion of the deconvolved signal bounded by a pair of time points will thus correspond to a portion of the concatenated signal bounded by the same pair of time points. The correlating signal for each trace is that portion of the deconvolved signal bounded by the same pair of time points as bound the reference signal associated with the trace in the concatenated signal.

The invention may be applied to seismic data generated in both land and marine seismic surveys, which may employ land seismic vibrators, marine seismic vibrators, or any other type of seismic source.

DETAILED DESCRIPTION OF THE PREFERRED EMBODIMENT

Figure 1:
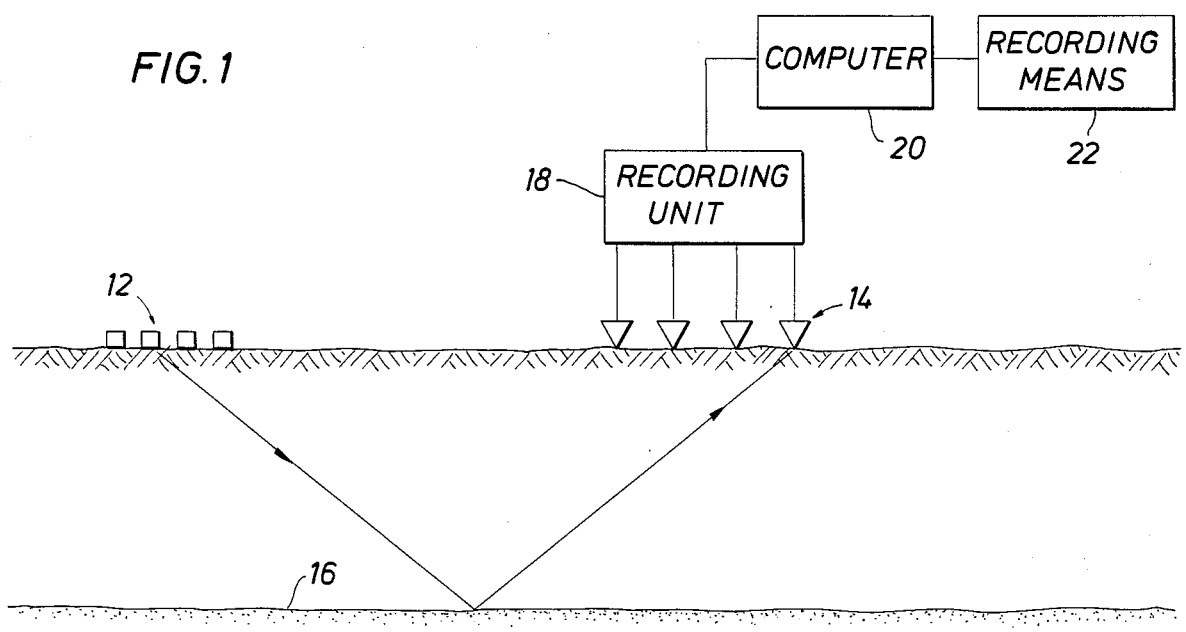
FIG. 1 is a schematic, simplified view of a land seismic system that may be used in performing the invention.
Figure 2:
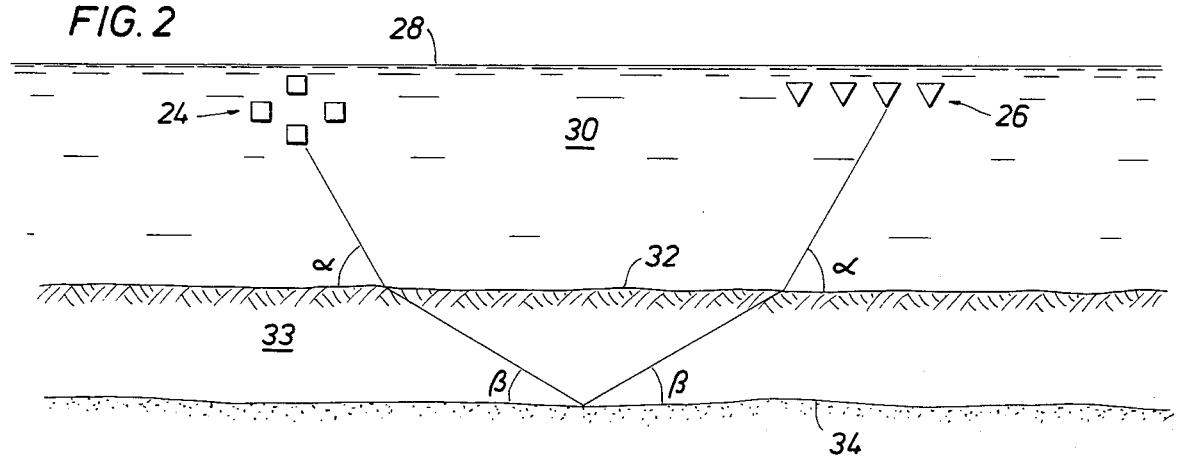
FIG. 2 is a schematic, simplified view of a marine seismic system that may be used in performing the invention.

The present invention may be applied to seismic data generated in both land and marine seismic surveys. FIG. 1 shows schematically a land seismic system that may be used in practicing the invention. FIG. 2 shows schematically a marine seismic system that may be used in practicing the invention.

With reference to FIG. 1, a plurality of seismic sources 12 are placed in close proximity at a desired location on the earth's surface. To geophones 14 placed at a distance from seismic sources 12, the signals from seismic sources 12 may appear to come from one location. Seismic sources 12 are operated in a conventional manner. The seismic signals generated are reflected by subterranean surfaces such as 16 and are detected by geophones 14, also in a conventional manner. It should be understood that although four seismic sources 12 are shown in FIG. 1, more than or less than four seismic sources may be employed. For example, it may be desirable to employ a single seismic source 12 in order to generate successively a plurality of seismic signals, which in general may possess distinctly different spectral characteristics.

The seismic data traces recorded at geophones 14 are recorded in recording unit 18 and delivered to computer 20 for processing. Recording means 22 is provided for recording the data subsequent to processing in computer 20. A suitable recording unit 18, computer 20 and recording means 22, may be selected from those commercially available.

With reference to FIG. 2, a plurality of marine seismic sources 22 are placed in a body of water 30 in close proximity to one another for the same reason as explained with reference to land seismic sources 12, and are operated in a conventional manner. Signals generated at marine seismic sources 24 propagate through body of water 30, past interface 32 between body of water 30 and subterranean earth formation 33, are reflected by subterranean surfaces such as 34, and are detected in a conventional manner by hydrophones 26, also disposed in body of water 30.

The invention is applicable in like manner to data generated in both marine and land seismic systems, and the discussion below will apply to both types of systems. Although any type of conventional seismic source 12 or marine seismic source 24 may be employed, for purposes of clarity the invention will be discussed below with reference to the particular embodiment wherein vibratory seismic sources ("vibrators") are employed. The term "vibrators" will be used to refer to both land and marine vibrators, and the term "detectors" will be used to refer to both geophones and hydrophones.

The energy generated by a vibratory seismic source is purposefully spread over long time durations. Since this signal energy is not concentrated near zero time ("T=0"), the seismic signal generated by such a source is not "minimum phase". A "minimum phase" time function having a particular frequency amplitude spectrum is one having non-zero amplitudes at positive values of time only, and whose energy is concentrated near T=0. It is well known that there is a unique minimum phase function corresponding to a signal having a given frequency amplitude spectrum. A minimum phase time function is to be contrasted with a so-called "zero phase" time function, which latter function is symmetric with respect to time (i.e., symmetric with respect to the T=0 axis).

The expression "reference sweep signal" will be used herein to denote a seismic signal generated by a vibratory seismic source in the form in which such signal is transmitted away from the vibratory source, before the signal propagates through any subterranean earth formation. Traditionally, seismic data traces received at one or more detectors subsequent to generation at a vibratory seismic source, are correlated with the associated reference sweep signal in order to perform pulse compression. The resulting traditionally sweep-correlated data traces consist of approximately zero phase wavelets.

As previously noted, a well known seismic prospecting technique include the steps of producing a plurality of seismic traces, each having a distinct frequency amplitude spectrum by using one or more vibratory seismic sources, then correlating each seismic data trace with its associated reference sweep signal, and thereafter summing or "stacking" the individual correlated signals (sometimes referred to as "correlograms").

Figure 3:
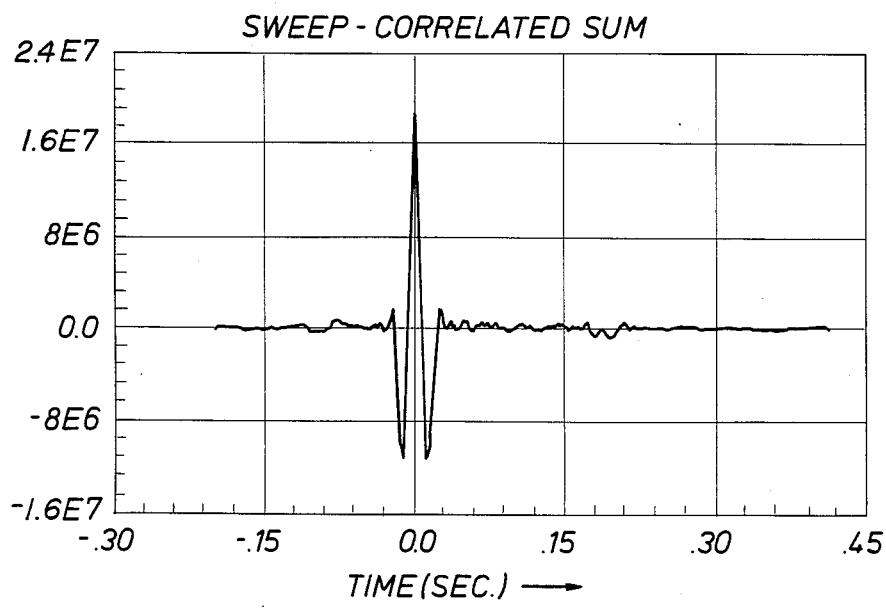
FIG. 3 is a sweep-correlated summed wavelet generated from four seismic data traces (each generated using a vibratory seismic source) by using the conventional method of correlating each individual data trace with its associated vibrator sweep signal and then stacking the correlated wavelets.

Typically, a vibratory seismic source is driven with a linear, frequency modulated signal which is several seconds in duration. In the particular example to be discussed with reference to FIGS. 3 through 7, four such seismic data traces are produced, each resulting from a sinusoidal reference sweep signal of four seconds duration. Each reference sweep signal is frequency modulated so as to sweep respectively through one of the following frequency ranges: 10 through 45 Hz, 20 through 55 Hz, 25 to 60 Hz, and 15 through 50 Hz. FIG. 3 represents the sum of the individual correlations of each of the above-described four reference sweep signals with the seismic data trace associated therewith, which data trace has been recorded at a detector after propagating through a subterranean earth formation. The signal shown in FIG. 3, produced by adding together several different approximately zero phase signals, is thus itself an approximately zero phase signal. Accordingly, the approximately zero phase signal shown in FIG. 3 presents to the interpreter the above-noted problems of difficulty in relating the reflection arrival time associated with the seismic signal to that obtained using dynamite data, and difficulty in picking a first arrival from the seismic signal shown in FIG. 3.

In accordance with the invention, individual seismic data traces produced by operating a vibratory seismic source are correlated with a specially generated correlating signal, and thereafter are stacked. The method of the present invention achieves the advantage of increasing resolution as does the traditional method described in the previous paragraph by adding or stacking several different correlated wavelets to reduce side lobes by rounding the spectrum of the summed wavelet. The present invention also alleviates the above-mentioned problems encountered with data generated according to the traditional method of the previous paragraph, by producing correlated wavelets which can be stacked to produce a minimum phase summed signal possessing a frequency amplitude spectrum which is the sum of the individual sweep frequency amplitude spectra.

In a preferred embodiment of the invention, each correlating signal (to be correlated with a particular seismic data trace) is generated in a manner which shall be explained with reference to the four reference sweep signals discussed with reference to FIG. 3. In such embodiment of the invention, the four reference sweep signals are concatenated, and one-half second of zero-amplitude signal inserted between each adjacent concatenated reference sweep signal, to produce the concatenated signal shown in FIG. 4.

Least-squares deconvolution is then applied to this concatenated signal to generate a concatenated, deconvolved sweep. The signal shown in FIG. 5 illustrates the signal of FIG. 4 after application thereto of least-squares deconvolution.

The process of least-squares deconvolution is well known in the art. Deconvolution is a form of filtering which is used to nullify objectionable effects of some earlier filter action. Deconvolution is used for example in removing reverberations, multiples, and ghosts from seismic data. The deconvolution process involves determination of an appropriate inverse filter and the convolution of the signal with such inverse filter. Least-squares deconvolution (a short name for least-squared-error-one-sample-prediction-filtering) involves determination of an approximate inverse to undesirable earth filters. The approximation employed is the one which is the best in the sense of least-squares error. A more detailed description of how such an approximate inverse filter is generated is set forth in K. L. Peacock and S. Treitel, "Predictive Deconvolution: Theory and Practice," *Geophysics*, Vol. 34, No. 2 (1969), pp 155–169.

Figure 4:
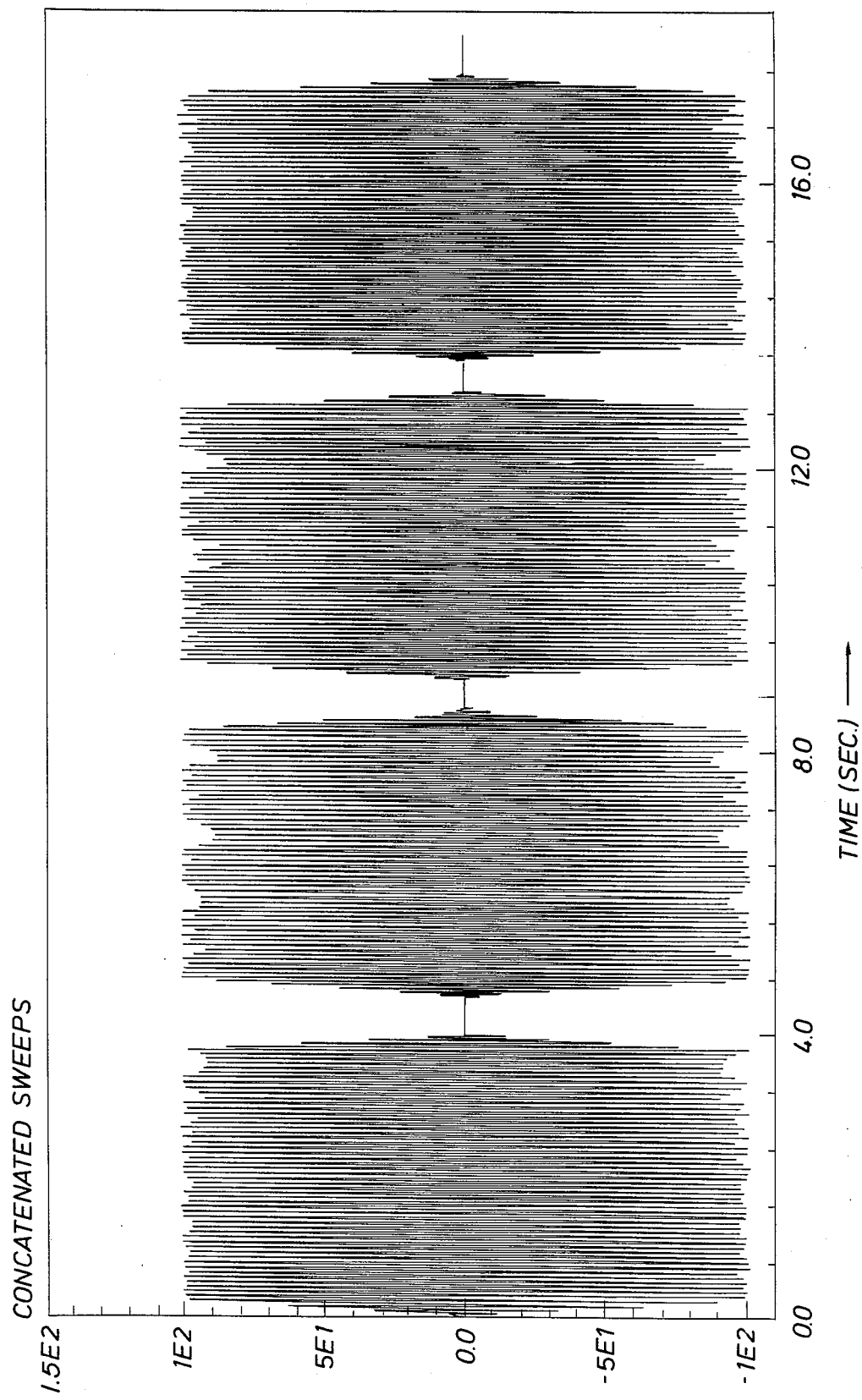
FIG. 4 is a concatenated signal generated in accordance with the invention which consists of four vibrator sweep signals concatenated into a long sweep, with a one-half second of zero-amplitude signal padded between each sweep.
Figure 5:
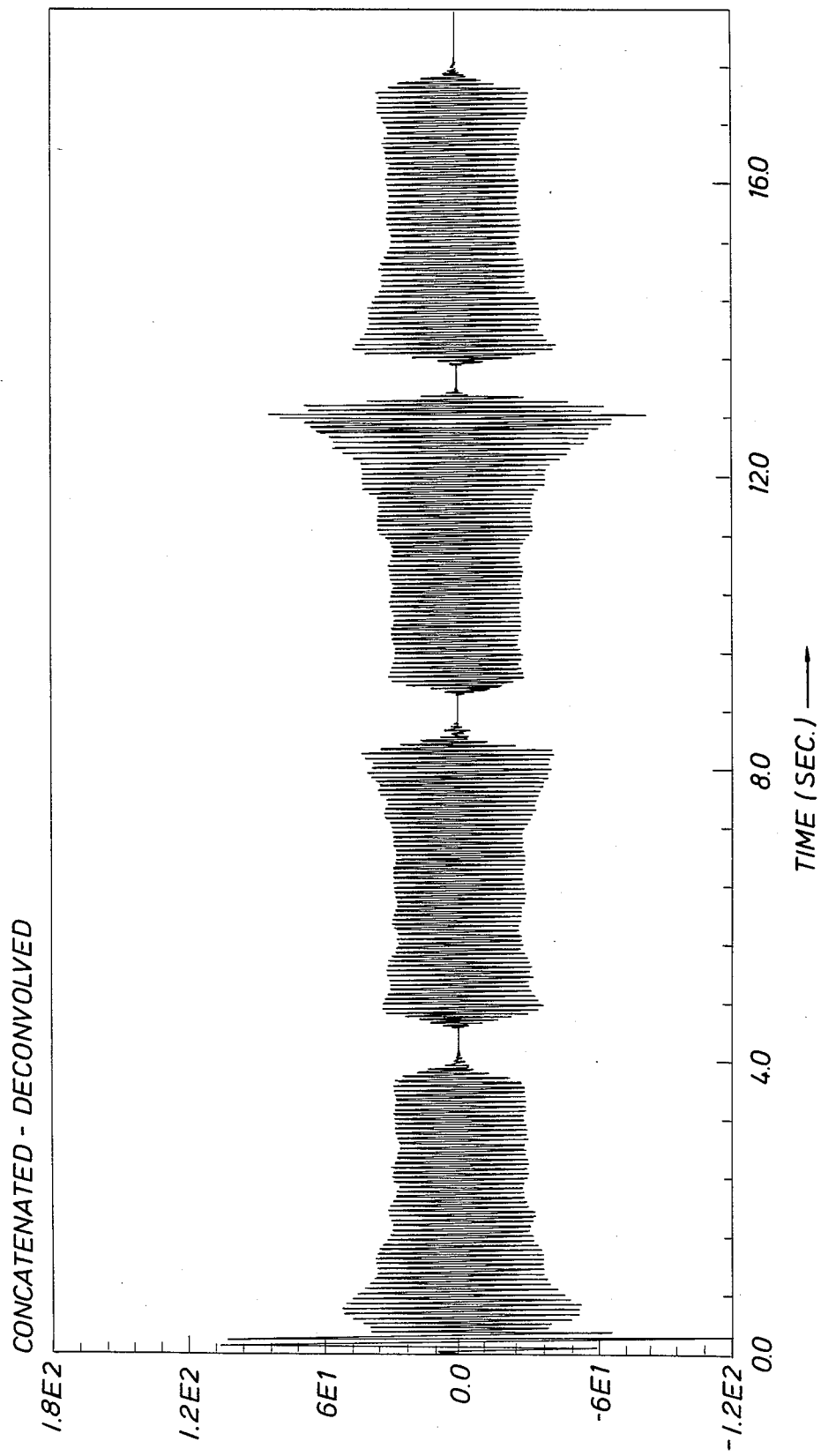
FIG. 5 is a concatenated, deconvolved sweep signal generated in accordance with the present invention by performing least-squares deconvolution on the signal of FIG. 4.

Correlation of a concatenated, deconvolved sweep signal of the type shown in FIG. 5 with a concatenated signal of the type shown in FIG. 4 will produce an approximately minimum phase signal whose frequency amplitude spectrum is the sum of those of the individual four reference sweep signals as desired. However, since correlation of such concatenated signals in this fashion is impractical, the preferred embodiment of the invention involves a more easily implemented alternate approach.

In the preferred embodiment of the present invention, a concatenated, deconvolved signal of the type shown in FIG. 5 is broken apart at the same time points where the original reference sweep signals were joined. This procedure produces a plurality of special correlating signals, each of which corresponds temporally to one of the original reference sweep signals. For example, with reference to FIG. 5, the signal of FIG. 5 would be broken into four pieces to generate four correlating signals each corresponding temporally to one of the original reference sweep signals.

Figure 6A:
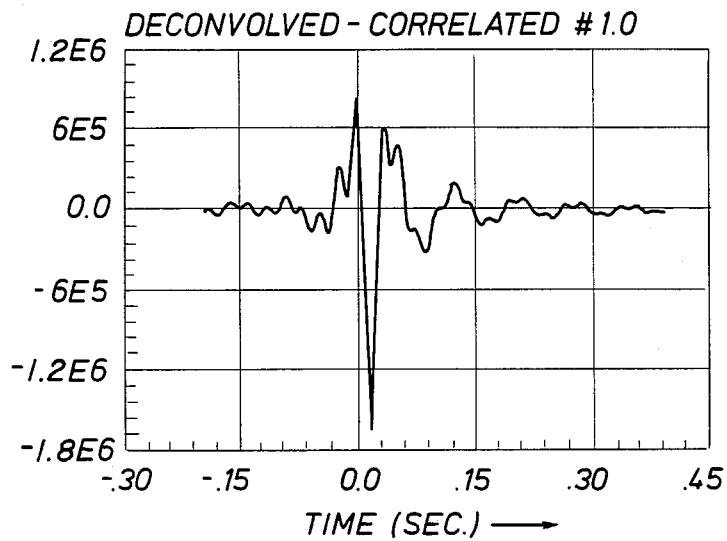
FIGS. 6a, 6b, 6c, and 6d, are respectively, individual correlated wavelets generated by correlating an individual vibrator sweep signal with the novel correlating signal of the invention associated with that vibrator sweep signal.
Figure 6B:
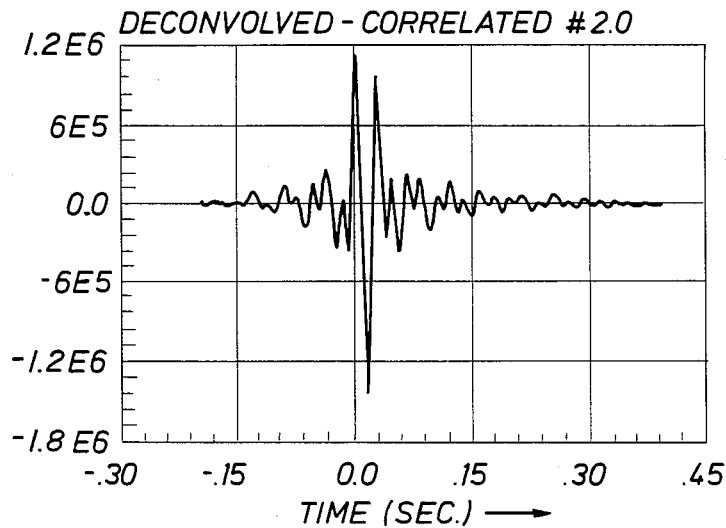
Figure 6C:
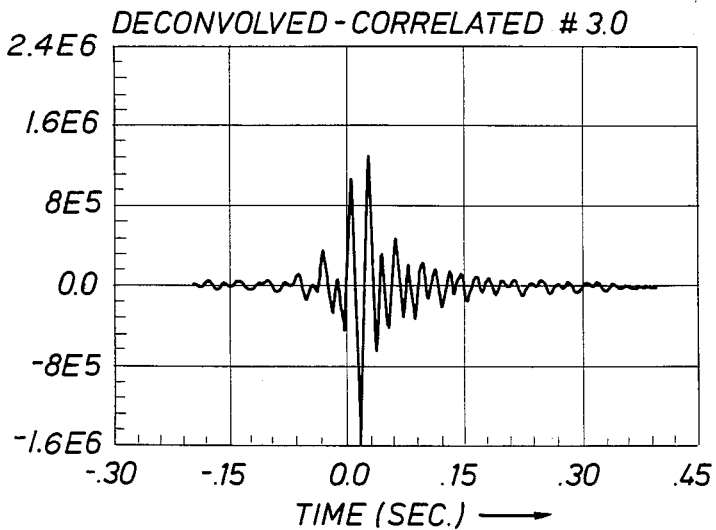
Figure 6D:
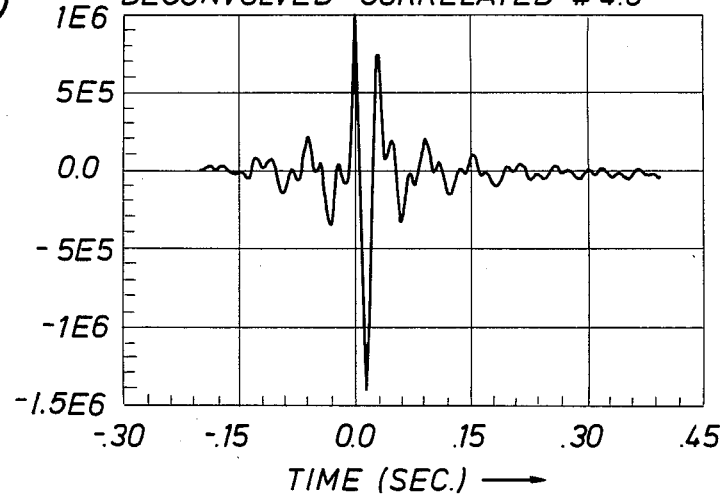
Figure 7:
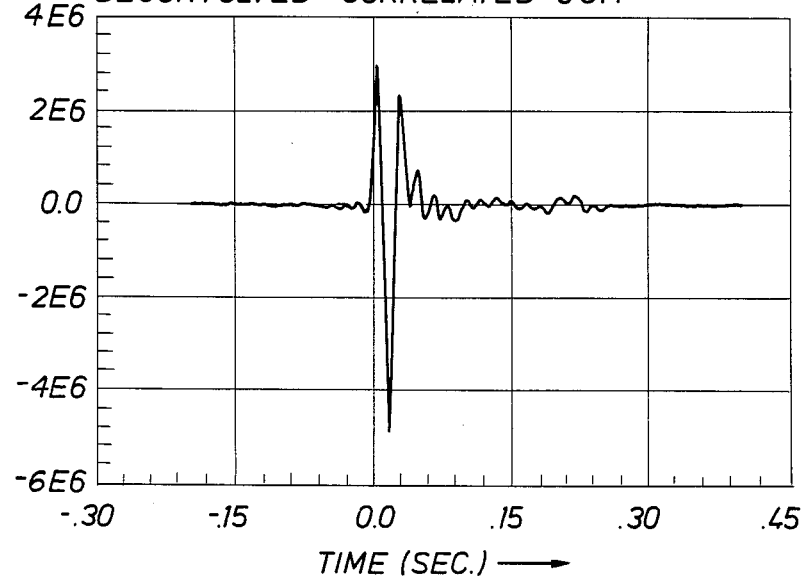
FIG. 7 is the sum of the four correlated wavelets shown in FIGS. 6a, 6b, 6c, and 6d.

After generating the desired special correlating signals, each correlating signal is correlated with the seismic data trace corresponding temporally thereto and associated therewith. With reference to the example discussed above with reference to FIGS. 4 and 5, each correlating signal generated from the signal shown in FIG. 5 is correlated with the associated one of the four seismic data traces resulting from the described four reference sweep signals. For simplicity, FIGS. 6a, 6b, 6c, and 6d illustrate the results of such correlation of the correlating signals, not with the four data traces associated with the four reference sweep signals, but with four reference sweep signals themselves. FIG. 6a is the correlated signal resulting from correlation of the correlating signal associated with the earliest time period (i.e. the left most of the four relevant portions of the FIG. 5 signal) with the reference sweep signal having frequency in the range 10 through 45 Hz. FIG. 6b results from correlation of the reference sweep signal having frequency in the range 20 through 55 Hz with its associated correlating signal. Similarly, FIG. 6c is the correlated signal resulting from correlation of the reference sweep signal having frequency in the range 25 through 60 Hz with its associated correlating signal. Similarly, FIG. 6d is the correlated signal resulting from correlation of the reference sweep signal having frequency in the range of 15 through 50 Hz with its associated correlating signal (the right-most of the four relevant portions of the FIG. 5 signal).

It will be recognized that the four individual correlated signals in FIGS. 6a, 6b, 6c, and 6d are not minimum phase signals. However, the summed correlated signal of FIG. 7, generated by adding together the four signals of FIGS. 6a through 6d, is approximately minimum phase (it is one sided and has few trailing cycles).

The example discussed with reference to FIGS. 6a, 6b, 6c, 6d, and 7 shows only the correlation of the correlating signal with the four individual reference sweep signals. In practice, the correlating signal will be correlated with each of the four entire seismic data traces associated with the four reference sweep signals. Each of the four seismic data traces will be of much greater duration than its associated reference sweep signal. Each reflection will, however, resemble the above example. Thus the resulting stacked signal will consist of minimum phase wavelets and will have a frequency amplitude spectrum which is the sum of the frequency amplitude spectra of the individual reference sweep signals.

The application of the preferred embodiment of the present invention in seismic surveys employing vibratory seismic sources has been discussed. However, the invention is also useful with other types of seismic surveys employing other varieties of seismic sources. For example if it is desired to combine marine seismic data obtained using an air gun and a water gun (which seismic sources have distinctly different spectral characteristics), the above described procedure is well suited for combining the seismic data obtained from these two sources, again so as to produce a final summed minimum phase signal having frequency amplitude spectrum equal to the sum of the frequency amplitude spectra of each data trace generated using the two marine seismic sources.

In the general, case a plurality of seismic signals, each having a characteristic frequency amplitude spectrum, are transmitted into a subterranean earth formation. A plurality of reference signals is generated each of which is substantially identical to a different one of the plurality of seismic signals. The return portion of each of the seismic signals after that seismic signal has propagated through the subterranean earth formation, is detected and recorded to produce the plurality of seismic data traces. A correlating signal for each seismic data trace is generated in the manner described above, then each seismic data trace is correlated with its associated correlating signal, and finally the correlated signals are stacked.

It will be apparent to those of ordinary skill in the art that in generating each of the correlating signals in the manner discussed above with reference to vibratory seismic sources, each pair of adjacent concatenated reference signals will be separated by a zero-amplitude signal having time duration not less than the operator length used for the deconvolution, so that the process of correlating each correlating signal (a piece of the entire deconvolved signal) with its associated data trace and then summing the correlated signals is essentially equivalent to the process of correlating the concatenated, deconvolved signal with the concatenated data traces.

The above description is merely illustrative of the present invention. Various changes in details of the methods described may be within the scope of the appended claims without departing from the spirit of the invention.

I claim:
1. A method of filtering and combining seismic data having different spectral characteristics, including the steps of:
   (a) transmitting a plurality of seismic signals into a subterranean earth formation, each of said signals having a characteristic frequency amplitude spectrum;
   (b) generating a plurality of reference signals each of which is substantially identical to a different one of said plurality of seismic signals;
   (c) recording a return portion of each of said seismic signals, after said seismic signal has propagated through the subterranean earth formation, to produce a plurality of seismic traces;
   (d) generating a correlating signal for each reference signal trace such that the sum of the correlations of each of said correlating signals with its associated trace is an approximately minimum phase signal whose frequency amplitude spectrum is the sum of the frequency amplitude spectra of the individual reference signals;
   (e) correlating each trace with its associated correlating signal; and
   (f) stacking the correlated signals generated in step (e).

2. A method of filtering and combining seismic data having different spectral characteristics, including the steps of:
   (a) transmitting a plurality of seismic signals into a subterranean earth formation, each of said signals having a characteristic frequency amplitude spectrum;
   (b) generating a plurality of reference signals each of which is substantially identical to a different one of said plurality of seismic signals;
   (c) recording a return portion of each of said seismic signals, after said seismic signal has propagated through the subterranean earth formation, to produce a plurality of seismic traces:
   (d) generating a correlating signal for each reference signal trace by concatenating the reference signals and inserting between each pair of concatenated reference signals a zero-amplitude signal having a selected time duration to generate a concatenated signal, and generating a deconvolved signal by performing least-squares deconvolution on the concatenated signal, so that each portion of the deconvolved signal bounded by any given pair of time points corresponds to a portion of the concatenated signal bounded by the same pair of time points, so that the correlating signal for each trace is that portion of the deconvolved signal bounded by the same pair of time points as bound the reference signal associated with the trace in the concatenated signal, and the sum of the correlations of each of said correlating signals with its associated trace is an approximately minimum phase signal whose frequency amplitude spectrum is the sum of the frequency amplitude spectra of the individual reference signals, where each selected time duration of each zero-amplitude signal is not less than the deconvolution operator length;
   (e) correlating each trace with its associated correlating signal; and
   (f) stacking the correlated signals generated in step (e).

3. The method of claim 1 wherein each reference signal is a sinusoidal, linear frequency modulated signal.

4. A method of filtering and combining seismic data having different spectral characteristics, including the steps of:
   (a) operating a vibratory seismic source with a first reference sweep signal having a first frequency amplitude spectrum to transmit into a subterranean earth formation a first seismic signal;
   (b) detecting a first received signal resulting from such first sweep signal;
   (c) operating a vibratory source with a second reference sweep signal having a second frequency amplitude spectrum to transmit into the subterranean earth formation a second seismic signal;
   (d) detecting a second received signal resulting from said second sweep signal;
   (e) generating a first correlating signal for said first seismic signal and a second correlating signal for said second seismic signal, so that the sum of the correlations of each of said correlating signals with its associated seismic signal is an approximately minimum phase signal whose frequency amplitude spectrum is the sum of the frequency amplitude spectra of the first seismic signal and the second seismic signal;
   (f) correlating each of the first and second received signals with its associated correlating signal; and
   (g) stacking the correlated signals generated in step (f).

5. A method of filtering and combining seismic data having different spectral characteristics, including the steps of:
   (a) operating a first vibratory seismic source with a first reference sweep signal having a first frequency amplitude spectrum to transmit into a subterranean earth formation a first seismic signal;
   (b) detecting a first received signal resulting from such first sweep signal;
   (c) operating a second vibratory source with a second reference sweep signal having a second frequency amplitude spectrum to transmit into the subterranean earth formation a second seismic signal;
   (d) detecting a second received signal resulting from said second sweep signal;
   (e) generating a first correlating signal for said first seismic signal and a second correlating signal for said second seismic signal, in such a manner that the sum of the correlations of each of said correlating signals with its associated seismic signal is an approximately minimum phase signal whose frequency amplitude spectrum is the sum of the frequency amplitude spectra of the first seismic signal and the second seismic signal, wherein each correlating signal is generated by
   concatenating the first an second referene sweep signals and inserting between the reference signals a zero-amplitude signal having a selected time duration to generate a concatenated signal, and
   generating a deconvolved signal by performing least-squares deconvolution on the concatenated signal, so that each portion of the deconvoled signal bounded by any given pair of time points corresponds to a portion of the concatenated signal bounded by the same pair of time points and the correlating signal for each seismic signal is that portion of the deconvolved signal bounded by the same pair of time points as bound the reference sweep signal associated with that seismic signal, where the selected time duration of each zero-amplitude signal is not less than the deconvolution operator length;
   (f) correlating each of the first and second received signals with its associated correlating signal; and
   (g) stacking the correlated signals generated in step (f).

6. The method of claim 4 wherein the first seismic signal and the second seismic signal are transmitted by the same vibratory seismic source.

7. A method of filtering and combining seismic data associated with a plurality of swept frequency seismic signals having different frequency amplitude spectra, including the steps of:
   (a) transmitting a plurality of swept frequency seismic signals into a subterranean earth formation, each of said signals having a characteristic frequency amplitude spectrum;
   (b) generating a plurality of reference signals, each of which is substantially identical to a different one of said seismic signals;
   (c) recording a return portion of each of said seismic signals after said seismic signal has propagated through the subterranean earth formation to produce a plurality of seismic data traces;
   (d) generating a correlating signal for each reference signal trace characterized in that the sum of the correlations of each of said correlating signals with its associated trace is an approximately minimum phase signal whose frequency amplitude spectrum is the sum of the frequency amplitude spectra of the plurality of seismic signals;
   (e) correlating each trace with its associated correlating signal; and
   (f) stacking the correlated signals generated in step (e).

* * * * *